US009778344B2

(12) United States Patent
Khong et al.

(10) Patent No.: US 9,778,344 B2
(45) Date of Patent: Oct. 3, 2017

(54) SYSTEM AND METHOD OF UTILIZING RF SIGNALING TO DETERMINE RANGE AND RELATIVE COORDINATES

(71) Applicant: MATRIX DESIGN GROUP, LLC, Newburgh, IN (US)

(72) Inventors: Jimmy Khong, Louisville, KY (US); Benjamin John Lemond, Newburgh, IN (US); Tracy L. Hayford, Newburgh, IN (US); Jason A. Kremer, Fort Branch, IN (US)

(73) Assignee: Matrix Design Group, LLC, Newburgh, IN (US)

( * ) Notice: Subject to any disclaimer, the term of this patent is extended or adjusted under 35 U.S.C. 154(b) by 0 days.

(21) Appl. No.: 15/222,542

(22) Filed: Jul. 28, 2016

(65) Prior Publication Data
US 2017/0030995 A1    Feb. 2, 2017

Related U.S. Application Data

(60) Provisional application No. 62/199,947, filed on Jul. 31, 2015.

(51) Int. Cl.
| | | |
|---|---|---|
| *H04W 24/00* | (2009.01) | |
| *G01S 5/02* | (2010.01) | |
| *H04W 4/02* | (2009.01) | |
| *G01S 5/14* | (2006.01) | |

(52) U.S. Cl.
CPC ............. *G01S 5/0289* (2013.01); *G01S 5/14* (2013.01); *H04W 4/023* (2013.01)

(58) Field of Classification Search
CPC ....... G01S 13/74; G01S 5/0284; G01S 5/0289

USPC ............ 455/456.1, 556.5; 701/300, 408, 470
See application file for complete search history.

(56) References Cited

U.S. PATENT DOCUMENTS

| | | | | |
|---|---|---|---|---|
| 7,403,783 | B2 * | 7/2008 | Cheok | ............... G01S 5/0284 455/456.1 |
| 7,983,694 | B2 * | 7/2011 | Cheok | ............... G01S 5/0284 455/456.5 |
| 8,010,133 | B2 * | 8/2011 | Cheok | ............... G01S 5/0284 455/456.5 |
| 8,214,147 | B2 * | 7/2012 | Cheok | ............... G01S 5/0284 701/470 |
| 9,201,140 | B2 * | 12/2015 | Lee | ..................... G01S 13/74 |
| 9,609,619 | B2 * | 3/2017 | Woodcock, IV | ... H04W 64/003 |
| 9,689,955 | B2 * | 6/2017 | Rosenbaum | ............. G01S 3/46 |
| 2005/0215269 | A1 * | 9/2005 | Cheok | ............... G01S 5/0284 455/456.1 |

(Continued)

*Primary Examiner* — William D Cumming
(74) *Attorney, Agent, or Firm* — Martin IP Law Group; C. Richard Martin

(57) ABSTRACT

A system and method of measuring the distance and determining the coordinate position of one or more target transceivers relative to a set of anchor transceivers with known locations is provided. The position of the target transceiver is determined by using a time-of-flight (TOF) initialization signal generated by the master anchor transceiver, a TOF response transmission generated by the target transceiver, calculation of the distances between the target transceiver and each anchor transceiver, and transmission of a TOF distance report by the master anchor transceiver. The system and method of the present invention permit the accurate locating of a target transceiver that is located "outside the box."

20 Claims, 4 Drawing Sheets

(56) References Cited

U.S. PATENT DOCUMENTS

| | | | |
|---|---|---|---|
| 2008/0103696 A1* | 5/2008 | Cheok | G01S 5/0284 701/300 |
| 2008/0167051 A1* | 7/2008 | Cheok | G01S 5/0284 455/456.5 |
| 2008/0234930 A1* | 9/2008 | Cheok | G01S 5/0289 701/408 |
| 2014/0057655 A1* | 2/2014 | Lee | G01S 13/74 455/456.1 |
| 2017/0030995 A1* | 2/2017 | Khong | G01S 5/0289 |
| 2017/0123426 A1* | 5/2017 | Hill | G05D 1/028 |

\* cited by examiner

SYSTEM AND METHOD OF UTILIZING RF SIGNALING TO DETERMINE RANGE AND RELATIVE COORDINATES

BACKGROUND OF THE INVENTION

1. Field of the Invention

The present invention relates to a system and method of measuring the distance and determining the relative position of a transceiver or plurality of transceivers to a set of transceivers with known locations using a radio frequency network. More specifically, the present invention relates to a system and that utilizes a master anchor transceiver and a plurality of slave anchor transceivers to determine the relative coordinates of a target transceiver. The method of the present invention involves the transmission of a time-of-flight (TOF) initialization signal by the master anchor transceiver, generation of a TOF response transmission by the target transceiver, calculation of the distances between the target transceiver and each anchor transceiver, transmission of a TOF distance report by the master anchor transceiver. Frequencies utilized are in what is considered the ultra-wideband spectrum, eg. 3.1 gHz-10.6 gHz. Travel times can be measured. Using relevant mathematical calculations, a distance measurement can be resolved between each target and each anchor which can be used to calculate a relative position.

2. Description of Prior Art

It is known in the prior art to use a plurality of anchor transceivers positioned in fixed locations to determine the location of a target transceiver that is located within the perimeter of those anchors. For example, in a warehouse setting, anchor transceivers can be placed at various locations, including the four corners of the building, such that the anchors are capable of generating and receiving RF signals from a target transceiver located within the building, and thus, within the perimeter of the area defined by the anchors. Because the location of the anchors is previously known, the location of a target transceiver can be quickly and easily determined by measuring the TOF of an RF signal between the target transceiver and two or more of the anchor transceivers. From the TOF data, the distance from the target transceiver to each anchor transceiver can be calculated. Because the distances between each of the anchor transceivers is known, simple geometry calculations may be utilized to determine the coordinates of the target transceiver relative to the anchor transceivers.

While these simple methods work well to determine the position of a target transceiver "inside the box", they do not work well for determining the position of a target transceiver that is "outside the box" as errors are significantly magnified. Thus, what is needed is a system for accurately determining the location of a target transceiver that is outside the perimeter defined by anchor transceivers, commonly referred to as outside the box.

SUMMARY OF THE INVENTION

The present invention is a system and method of measuring the distance and determining the coordinate position of one or more target transceivers relative to a set of anchor transceivers with known locations using a radio frequency network. The position of the target transceiver is determined by using a time-of-flight (TOF) initialization signal generated by the master anchor transceiver, a TOF response transmission generated by the target transceiver, calculation of the distances between the target transceiver and each anchor transceiver, and transmission of a TOF distance report by the master anchor transceiver. The system and method of the present invention permit the accurate locating of a target transceiver that is located "outside the box."

According to one aspect of the present invention, there is provided a system for determining range and relative coordinates of an object. The system includes a master anchor transceiver, a target transceiver and a plurality of slave anchor transceivers. The master anchor transceiver generates and transmits a time of flight radio frequency initialization signal. The target transceiver is associated with the object to be located and receives and processes the initialization signal and, in response, generates and transmits a time of flight radio frequency response signal. The plurality of slave anchor transceivers receive the initialization signal and the response signal. Preferably either two or three slave anchor transceivers are provided. The master anchor transceiver may preferably be fixedly positioned in an area of interest and the location of the master anchor is known. Similarly, each of the plurality of slave anchor transceivers may preferably be fixedly positioned in an area of interest and the location of each of the slave anchor transceivers is known.

According to a further aspect of the invention, where only two slave anchor transceivers are utilized, the master anchor and slave anchors are preferably positioned at the three corners of the area of interest. Likewise, where three slave anchor transceivers are used, the master anchor and slave anchors are positioned at the four corners of the area of interest.

According to another preferred aspect of the present invention, a method for determining range and relative coordinates of an object is provided. According to the method, a time of flight radio frequency initialization signal is transmitted by a master anchor transceiver and received and processed by a target transceiver that is associated with the object. The target transceiver then generates and transmits a time of flight radio frequency response signal that is received and processed by the master anchor transceiver and each of the plurality of slave anchor transceivers. Next, the distances between the target transceiver and the master anchor transceiver and between the target transceiver and a plurality of slave anchor transceivers are calculated. From that information, the coordinate position of the target transceiver is calculated relative to the master anchor transceiver. Lastly, a time of flight radio frequency distance report is transmitted by the master anchor transceiver.

According to a further aspect of the method invention, during the transmission of the initialization signal the target transceiver and plurality of slave anchor transceivers are in listen mode. Further, the distances between the master anchor transceiver and each slave anchor transceiver are known. Similarly, during the transmission of the response signal, the master anchor transceiver and plurality of slave anchor transceivers are in listen mode. The time of flight radio frequency distance report preferably includes the distance between the target transceiver and the master anchor transceiver. The calculation of distance step preferably includes the step of determining the clock drift for each of the slave anchor transceivers relative to the master anchor transceiver, and may further include the step of determining the time difference of arrival of the response signal for all anchor transceivers, and the step of determining the straight line distances between the target transceiver and each of the slave anchor transceivers. Also, the step of calculation of the coordinate position of the target transceiver may comprise triangulation of the position of the target transceiver using the known distances between the target transceiver and the master anchor transceiver and each slave anchor transceiver and the target transceiver.

It is an object of the present invention to provide a system and method of measuring the distance and determining the relative position of a transceiver or plurality of transceivers to a set of transceivers with known locations using a radio frequency network. It is a further object of the invention to provide a system and method of accurately determining the position of a transceiver that is located outside an area of interest that is bounded by anchors.

These and other objects, features and advantages of the present invention will become apparent with reference to the text and the drawings of this application.

DETAILED DESCRIPTION OF PREFERRED EMBODIMENTS

Figure 1:
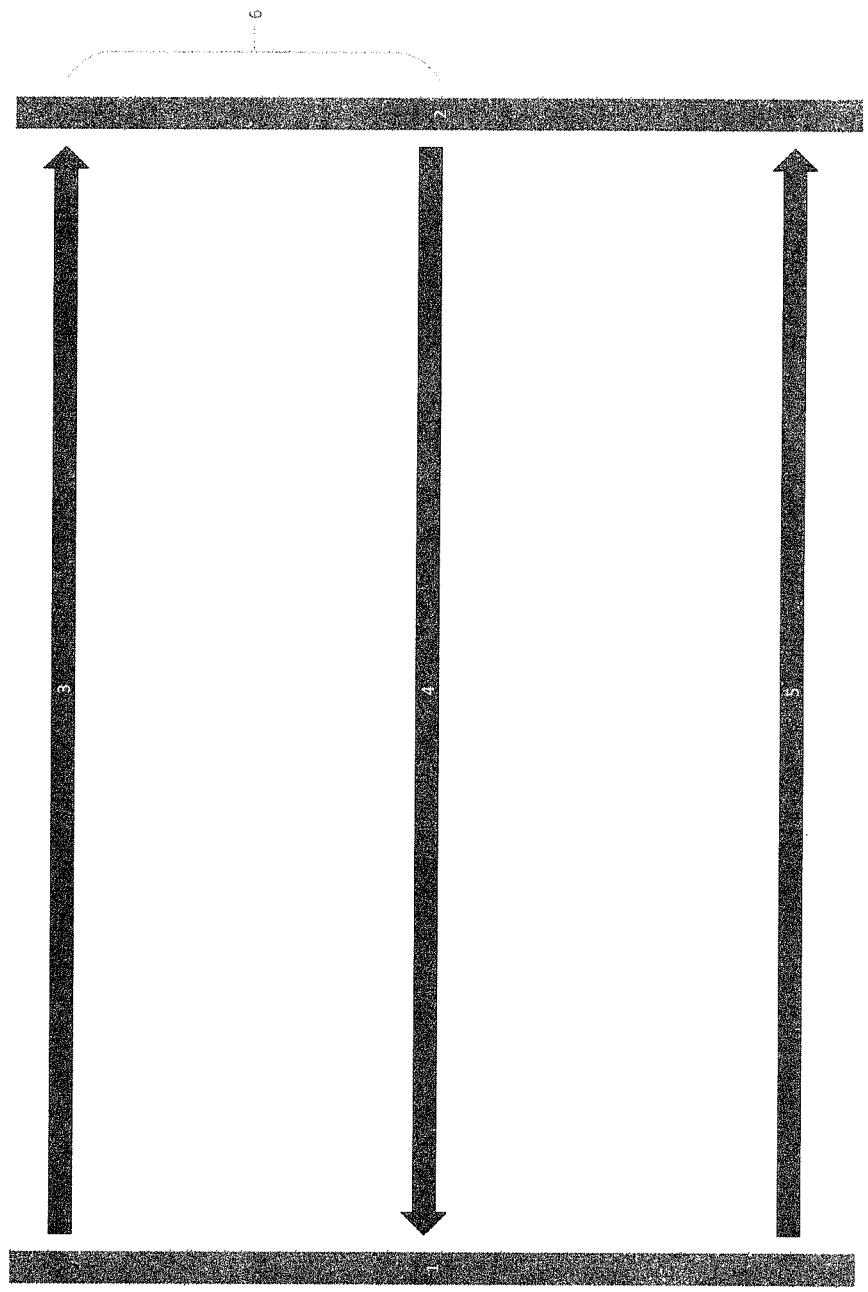
FIG. 1 is a timing diagram outlining the actors and transactions in determining time of flight of an RF transmission from a source to a target according to one presently preferred embodiment of the invention.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

The present invention is comprised of a system and method of measuring the distance and determining the relative position of a transceiver or plurality of transceivers to a set of transceivers with known locations using a radio frequency network. FIG. 1 shows the progression of transmissions that must occur to recover a Time of Flight (TOF) measurement between a source transceiver 1 and target transceiver 2. TOF initialization transmission 3 is broadcast at time 0 (T0). TOF response transmission 4 is prepared and returned by the target transceiver 2 after static processing time 6 elapses. The response transmission contains the processing delay. Source transceiver 1 receives response transmission 4 at time 1 (T1). Using the simple formula (T1−T0−Static Delay 6)/2 the time of flight (TOF) may be determined. By applying the constant for the speed of light, that TOF may be converted to a distance. The source transceiver 1 sends out a broadcast TOF distance report transmission 5. According to one presently preferred embodiment of the invention, prior to the TOF initialization transmission 3 being sent, the target transceiver 2 broadcasts a handshake message to alert the source transceiver 1 to its presence. This handshake message just alert the system to the presence of the target transceiver 2 and is not part of any timing critical or measurement critical components.

Figure 2B:
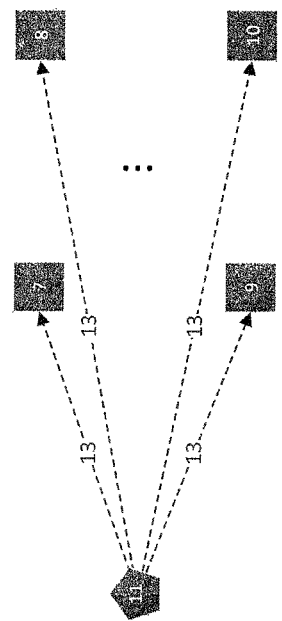
FIG. 2b is a functional diagram of the system shown in FIG. 2a illustrating the step of TOF response transmission.
Figure 2A:
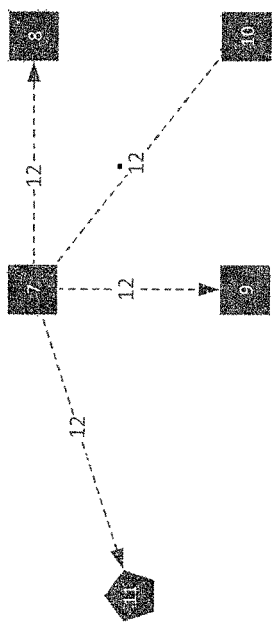
FIG. 2a is a functional diagram of a system of utilizing RF signaling to determine range and relative coordinates of a target object relative to the position of a plurality of known positions according to one presently preferred embodiment of the invention, illustrating the step of TOF initialization transmission.
Figure 2C:
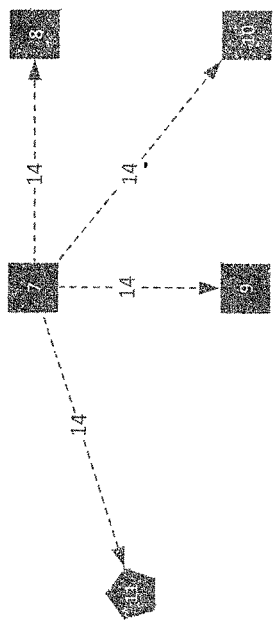
FIG. 2c is a functional diagram of the system shown in FIG. 2a illustrating the step of TOF distance report transmission.

FIGS. 2a-2c show an exemplary system of utilizing RF signaling to determine range and relative coordinates of a target object relative to the position of a plurality of known positions according to one presently preferred embodiment of the invention. The system shown in FIGS. 2a-2c includes a target transceiver 11, which is attached to an article or object for which it is desired to determine the position or coordinates, a master anchor transceiver 7, and three slave anchor transceivers 8, 9, 10. Although the embodiment shown in the drawings utilizes three slave anchor transceivers, accurate results can be obtained using as few as two slave transceivers, and more accurate results may be obtained by using more than three slave transceivers.

The master anchor transceiver 7 and slave anchor transceivers 8, 9, 10 are fixedly positioned in an area of interest to the user, and their coordinates are known. For example, if there is a work area of concern, the four anchor transceivers 7, 8, 9, 10 can be placed at the four corners of the worksite thereby defining the area of concern. Unlike prior art systems, not only can the present system determine the location of the target within the work zone, commonly referred to as inside the box, but it can also determine the position of a target outside the work zone, commonly referred to as outside the box.

The system is designed for measuring the time of flight (TOF) of a radio frequency (RF) transmission 12 between the master anchor transceiver 7 and target transceiver 11 as well as the time difference of arrival of transmission 12 from the slave anchor transceivers 8, 9, 10 and the target transceiver 11. It is in this manner that the coordinates of the target transceiver 11 relative to the known coordinates of the master anchor transceiver 7 and slave anchor transceivers 8, 9, 10 can be determined.

The method of utilizing RF signaling to determine range and relative coordinates of a target object relative to the position of a plurality of known positions involves three primary steps which are shown sequentially in FIGS. 2a-2c. Generally, in step one, shown in FIG. 2a, the current master anchor transceiver 7 initiates a ranging session using a time of flight (TOF) measurement between itself and a target transceiver 11. In this step, an initialization TOF RF transmission 12 is transmitted from the master anchor transceiver 7. The slave anchor transceivers 8, 9, 10 and the target transceiver 11 are in listen mode during this step awaiting this type of transmission. In the preferred embodiment, the master anchor transceiver 7 and slave anchor transceivers 8, 9, 10 are all located in fixed positions, and, as such the distances between the master anchor transceiver 7 and each slave anchor transceiver 8, 9, 10 are known and it is not necessary to determine the TOF for the RF transmission between the master anchor transceiver 7 and each slave anchor transceiver 8, 9, 10.

In step two, shown in FIG. 2b, the target transceiver 11 responds with an RF pulse 13 of its own. Once the initialization TOF transmission 12, from step one is received and processed by the target transceiver 11, the target transceiver then generates and sends out a TOF response transmission 13. During this step, the anchors (master and slave) 7, 8, 9, 10 are all in listen mode and all simultaneously listen to the TOF response transmission 13. Because of the differences in the position of the anchors to target 11, this transmission is received at different times. At this point we know the TOF measurement between the master anchor transceiver 7 and target transceiver 11.

In step 3, once the distance between the target transceiver 11 and the master anchor transceiver 7 has been calculated, a final RF distance transmission 14, as shown in FIG. 2c, including the distance between the target transceiver 11 and the master anchor transceiver 7, is sent from the master anchor transceiver 7, and is received by each of the slave anchor transceivers 8, 9, 10.

The clock drift can be known for slave anchors 8, 9, 10 relative to the master anchor 7 because the timing of the TOF measurement that took place between master anchor transceiver 7 and target transceiver 11 is now known. Because anchors 7, 8, 9, 10 listen to TOF transmission 13 simultaneously and because we know the clock drift for slave anchor transceivers 8, 9, 10 relative to master anchor transceiver 7 we can determine the time difference of arrival (TDOA) of the TOF transmission 13 for all anchors. We then use the TOF measurement from step one and step two, and relative differences to determine the straight line distances between all anchors and target 11. For example, we can determine the straight line distance from target 11 to anchor transceiver 8 by using this simple formula:

Let T0=time TOF transmission 13 received at master anchor transceiver 7

Let T1=time TOF transmission 13 received at slave anchor transceiver 8

Let $D01=T0-T1$ (RangeTransceiver 8=TOF measurement 14–$D01$)

By listening to all three of those messages 12, 13, 14 the plurality of slave anchor transceivers 8, 9, 10 can determine their clock drift relative to the current master anchor. Given all subsequent slave anchors have a time measurement and clock drift relative to the master anchor and the distance from the master anchor to the target is known, the difference in timestamps between the anchors can be utilized to determine their distance to the target thus providing a position related to the system of anchors.

Once the straight line distances between all transceivers has been determined, the position of the target transceiver 11 can be determined by triangulation of its position in X/Y coordinates, given the known distances between the respective transceiver and the known positions of the master anchor transceiver 7 and slave anchor transceivers 8, 9, 10.

One of ordinary skills in the art will recognize that additional steps and configurations are possible without departing from the teachings of the invention. Although the preferred embodiments of the present invention describe and utilize radio frequency (RF) data to calculate the location of the target transceiver, other similar distance measurement data from a variety of sensors may be used to obtain similar results. One such alternative to RF data would be to utilize magnetics, alone, or in combination with RF data, to calculate the location of the person or second machine. Similarly, laser light based remote sensing technologies such as LIght Detection And Ranging (LIDAR) may also be used to as a substitute for RF data. Other equivalent technologies for remote sensing will be apparent to those of skill in the art.

Figure 3A:
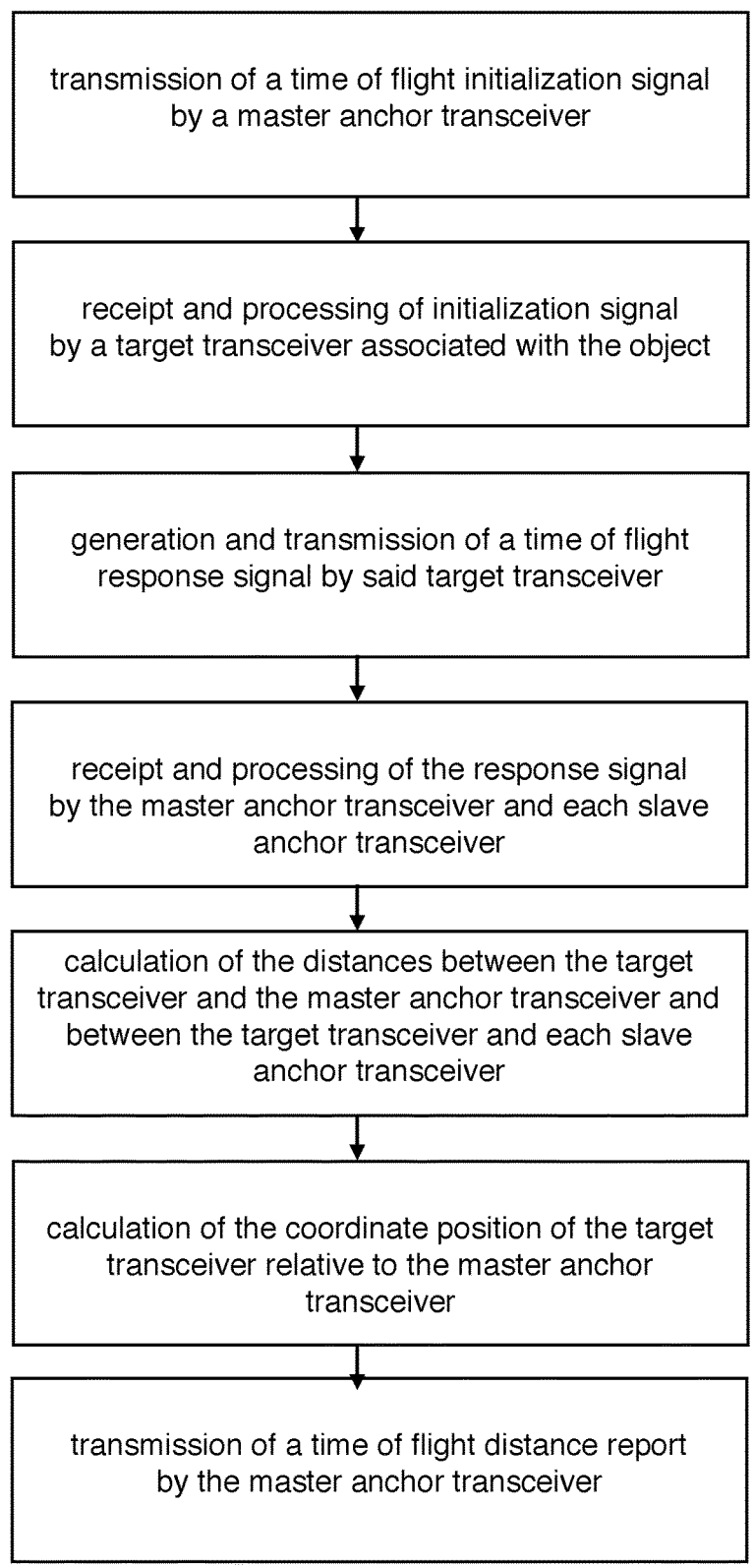
FIG. 3a is a flow chart showing the primary steps of the method of utilizing RF signals to determine range and relative coordinates according to one preferred embodiment of the present invention.

The various steps of the method for determining range and relative coordinates of an object is shown in FIG. 3a. According to the method, a time of flight radio frequency initialization signal is transmitted by a master anchor transceiver and received and processed by a target transceiver that is associated with the object. The target transceiver then generates and transmits a time of flight radio frequency response signal that is received and processed by the master anchor transceiver and each of the plurality of slave anchor transceivers. Next, the distances between the target transceiver and the master anchor transceiver and between the target transceiver and a plurality of slave anchor transceivers are calculated. From that information, the coordinate position of the target transceiver is calculated relative to the master anchor transceiver. Lastly, a time of flight radio frequency distance report is transmitted by the master anchor transceiver.

Figure 3B:
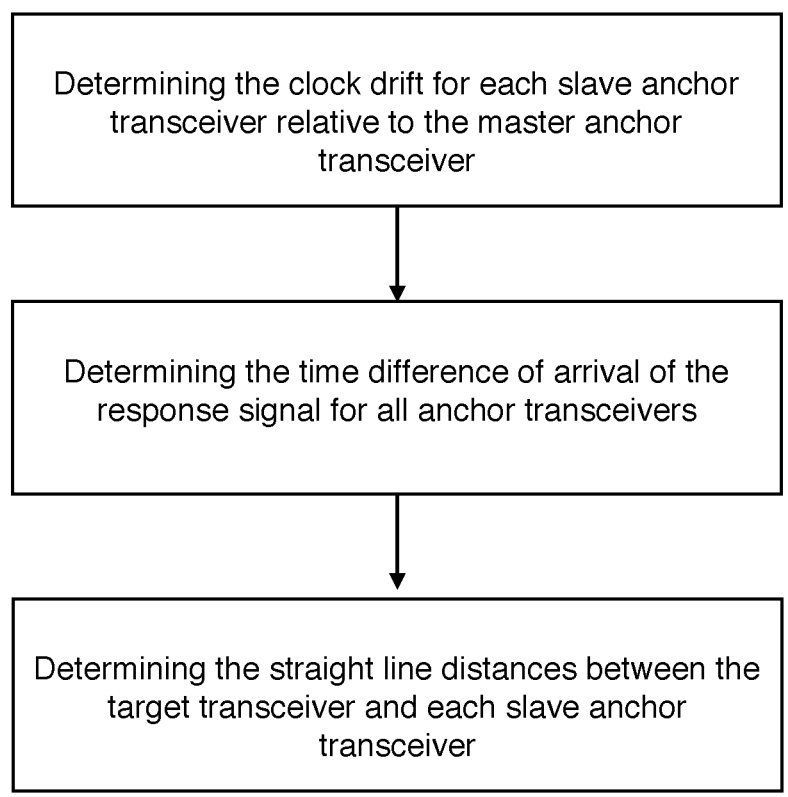
FIG. 3b is a flow chart showing sub-steps of the calculation of distance step (step 5) shown in FIG. 3a according to one preferred embodiment of the present invention.

As best shown in FIG. 3b, the calculation of distance step preferably includes three sub-steps. The first step is to determine the clock drift for each of the slave anchor transceivers relative to the master anchor transceiver. Next comes the step of determining the time difference of arrival of the response signal for all anchor transceivers. Lastly, the straight line distances between the target transceiver and each of the slave anchor transceivers are determined.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. A system for determining range and relative coordinates of an object comprising:
   a master anchor transceiver for generating and transmitting a time of flight initialization signal;
   a target transceiver associated with said object for receiving and processing said initialization signal and for generating and transmitting a time of flight response signal; and
   a plurality of slave anchor transceivers for receiving said initialization signal and said response signal.

2. The system for determining range and relative coordinates of an object according to claim 1 wherein said plurality of slave anchors comprises two slave anchors.

3. The system for determining range and relative coordinates of an object according to claim 1 wherein said plurality of slave anchors comprises three slave anchors.

4. The system for determining range and relative coordinates of an object according to claim 1 wherein the master anchor transceiver is fixedly positioned in an area of interest and the location of the master anchor is known.

5. The system for determining range and relative coordinates of an object according to claim 4 wherein each of the plurality of slave anchor transceivers are fixedly positioned in an area of interest and the location of each of the slave anchor transceivers is known.

6. The system for determining range and relative coordinates of an object according to claim 5 wherein said plurality of slave anchors comprises two slave anchors.

7. The system for determining range and relative coordinates of an object according to claim 6 wherein the master anchor and slave anchors are positioned at the three corners of the area of interest.

8. The system for determining range and relative coordinates of an object according to claim 5 wherein said plurality of slave anchors comprises three slave anchors.

9. The system for determining range and relative coordinates of an object according to claim 8 wherein the master anchor and slave anchors are positioned at the four corners of the area of interest.

10. The system for determining range and relative coordinates of an object according to claim 1 wherein the initialization signal and response signal are radio frequency signals.

11. A method for determining range and relative coordinates of an object comprising:
- transmission of a time of flight initialization signal by a master anchor transceiver;
- receipt and processing of said initialization signal by a target transceiver that is associated with said object;
- generation and transmission of a time of flight response signal by said target transceiver;
- receipt and processing of said response signal by said master anchor transceiver and each of said plurality of slave anchor transceivers;
- calculation of the distances between said target transceiver and said master anchor transceiver and between the target transceiver and a plurality of slave anchor transceivers;
- calculation of the coordinate position of the target transceiver relative to the master anchor transceiver; and
- transmission of a time of flight distance report by the master anchor transceiver.

12. The method for determining range and relative coordinates of an object according to claim 11 wherein the target transceiver and plurality of slave anchor transceivers are in listen mode during the transmission of the initialization signal.

13. The method for determining range and relative coordinates of an object according to claim 11 wherein the distances between the master anchor transceiver and each slave anchor transceiver are known.

14. The method for determining range and relative coordinates of an object according to claim 11 wherein the master anchor transceiver and plurality of slave anchor transceivers are in listen mode during the transmission of the response signal.

15. The method for determining range and relative coordinates of an object according to claim 11 wherein the time of flight radio frequency distance report includes the distance between the target transceiver and the master anchor transceiver.

16. The method for determining range and relative coordinates of an object according to claim 11 wherein the calculation of distance step includes the step of determining the clock drift for each of the slave anchor transceivers relative to the master anchor transceiver.

17. The method for determining range and relative coordinates of an object according to claim 16 wherein the calculation of distance step further includes the step of determining the time difference of arrival of the response signal for all anchor transceivers.

18. The method for determining range and relative coordinates of an object according to claim 17 wherein the calculation of distance step further includes the step of determining the straight line distances between the target transceiver and each of the slave anchor transceivers.

19. The method for determining range and relative coordinates of an object according to claim 18 wherein the step of calculation of the coordinate position of the target transceiver comprises triangulation of the position of the target transceiver using the known distances between the target transceiver and the master anchor transceiver and each slave anchor transceiver and the target transceiver.

20. The method for determining range and relative coordinates of an object according to claim 11 wherein the initialization signal and response signal are radio frequency signals.

* * * * *